United States Patent [19]

Sresty

[11] Patent Number: 5,013,532

[45] Date of Patent: May 7, 1991

[54] METHOD FOR RECYCLING ELECTRIC ARC FURNACE DUST

[75] Inventor: Guggilam C. Sresty, Burbank, Ill.

[73] Assignee: IIT Research Institute, Chicago, Ill.

[21] Appl. No.: 285,088

[22] Filed: Dec. 15, 1988

[51] Int. Cl.$^5$ .................... C01G 28/00; C01G 21/00; C01G 9/00; C01G 49/00

[52] U.S. Cl. ........................................ 423/88; 423/97; 423/107; 423/108; 423/149; 423/617; 423/619; 423/622; 423/623; 75/961; 75/703; 75/668; 75/693; 75/654; 75/656; 75/658

[58] Field of Search .............. 423/87, 107, 108, 149, 423/617, 619, 622, 623, 88, 97; 75/961, 703, 668, 693, 654, 656, 658, 707, 10.3, 10.31, 10.32

[56] References Cited

U.S. PATENT DOCUMENTS

| 1,628,952 | 5/1927 | Cregan | 423/108 |
|---|---|---|---|
| 1,754,170 | 4/1930 | Johannsen | 423/88 |
| 1,941,569 | 1/1934 | McCraven | 75/88 |
| 1,973,590 | 9/1934 | Weaton et al. | 423/108 |
| 2,790,710 | 4/1957 | Cavanagh | 75/91 |
| 3,157,488 | 11/1964 | Taylor | 75/90 R |
| 3,649,186 | 3/1972 | Colombo et al. | 423/108 |
| 3,850,613 | 11/1974 | Allen | 423/107 |
| 3,944,413 | 3/1976 | Volk | 75/91 |
| 4,099,963 | 7/1978 | Mackay | 75/91 |
| 4,115,524 | 9/1978 | Cines | 75/88 |
| 4,135,914 | 1/1979 | Vuletic et al. | 75/25 |
| 4,326,884 | 4/1982 | Soriano | 75/71 |
| 4,396,424 | 8/1983 | Yatsunami et al. | 75/77 |
| 4,673,431 | 6/1987 | Bricmont | 75/25 |

*Primary Examiner*—Michael L. Lewis
*Assistant Examiner*—Steven Bos
*Attorney, Agent, or Firm*—Fitch, Even, Tabin & Flannery

[57] ABSTRACT

This invention relates to the metallurgy of iron and particularly to the separation and recovery of metals from electric arc furnace (EAF) dusts. While the invention discloses a process for the separation and recovery applicable to zinc, lead, cadmium and antimony contained in such EAF dusts, the invention is particularly applicable to the separation and recovery of zinc. This invention describes a method for reducing the zinc contained in an EAF dust, volatilizing the metallic zinc so produced from the mass of the dust, and reoxidizing the metallic zinc to zinc oxide along with the simultaneous regeneration of hydrogen which can be recycled to treat additional EAF dust.

9 Claims, No Drawings

METHOD FOR RECYCLING ELECTRIC ARC FURNACE DUST

BACKGROUND OF THE INVENTION

1. Technical Field

This invention relates to the metallurgy of iron and zinc, and particularly to the separation of zinc from iron and other metals found in the dusts produced in the electric arc furnace (EAF) steel making process. The invention also applies to dusts arising from a foundry, blast furnace or other source. In addition to zinc, metals and/or metal oxides which may be recovered by the process of this invention include cadmium, lead and antimony. Additional applications may also be found in the recovery of zinc from ore concentrates, recovered or waste metallic powders from coatings industries, wastewater treatment solids from high zinc wastewaters such as are found in the munitions industry, and the like.

The problem encountered in the processing of electric arc furnace dusts is one of finding an economical method of separating the zinc from the remainder of the dust which consists mainly of iron, manganese, nickel, silicon and smaller quantities of other elements. Part of the problem in removing zinc from the dust stems from the fact that the zinc is often combined with the iron in the form of zinc ferrite. Removing zinc from a bimetallic compound is a more difficult task than one in which zinc and iron are present as discrete compounds; for example, a mixture of zinc oxide and iron oxide. The objective of a zinc/iron separation process, such as the invention disclosed herein, is to remove and recover the zinc and to obtain an iron containing product which can be safely disposed or which can be recycled to the steel making process without further purification or separation.

This invention describes an economical process which uses hydrogen to reduce zinc oxide to zinc metal, sweeps the zinc metal from the furnace dust or other source, reoxidizes the zinc to zinc oxide with simultaneous regeneration of the hydrogen, recycles the hydrogen to the process, recovers the separated zinc oxide, and produces a zinc-depleted, iron-containing dust which can be recycled back to the steelmaking process.

2. Prior Art

In the ores, dusts and powders to which this invention is directed, the zinc is substantially present in the form of zinc oxide. The prior art methods of separation involve reducing the zinc oxide to zinc metal at a temperature at which zinc metal has a vapor pressure sufficient to permit it to be sublimed or swept from the system by a gas stream. Pure zinc boils at 907° C. and has a vapor pressure of 0.1 atmosphere at 750° C. It is known to use carbon or carbon containing compounds such as methane or carbon monoxide as a reductant for zinc. Though hydrogen could have been used instead of methane or carbon monoxide in the prior art processes, it has not been so favored because its use is thermodynamically less favorable, higher temperatures are required and, until the present invention, the hydrogen could not be regenerated and recycled. The inability to regenerate and recycle hydrogen has been the primary drawback because of the higher associated operating costs.

U.S. Pat. Nos. 4,393,423 and 4,053,301 to Stephens, describe a process which uses hydrogen as a reductant, but the hydrogen is used in conjunction with other reducing gases such as methane and carbon monoxide. Stephens describes his invention in the '423 patent as involving a carbiding step to produce iron carbide and distillable zinc from a flue dust containing iron and zinc compounds, including zinc ferrite. Stephens teaches the use of hydrogen in conjunction with a carbon containing gas, but does not disclose the use of hydrogen gas as the sole or principal reducing agent, nor does he suggest a method in which the zinc is reoxidized and the hydrogen is regenerated and recycled. In both Stephens patents, hydrogen is used on a net once through basis, the hydrogen combining with oxygen to form water which is condensed and removed from the recycle reducing gas stream. The present invention differs from the Stephens invention in that hydrogen is the sole reducing agent and that the hydrogen is regenerated by reaction of the zinc metal swept from the flue dust with the water during a reoxidation step. The regeneration of the hydrogen is accomplished in the overall process of the present invention in two steps. In the first step, hydrogen and zinc oxide react at one temperature to form distillable zinc metal vapor and water vapor. In the second step, the zinc metal vapor and water vapor recombine at a lower temperature to reform zinc oxide, which is removed by filtration or other means, and hydrogen, which is recycled to the process.

In addition to the Stephens patents, other prior patent art pertinent to the invention are U.S. Pat. Nos. 4,318,736 to Driemeger; 3,975,118 to Harvey et al.; 3,449,117 to Derham; 4,131,451 to Lakernick et al.; 3,140,168 to Halley et al.; 3,288,590 to Keith et al.; and 1,946,601 to Hansgrig. Driemeger suggests using a hydrogen rich gas ($H_2$ and CO) to sweep iron ore dust (essentially pure iron oxide) into a steel making furnace where the iron ore dust will be "spontaneously reduced" to metallic iron. Harvey et al. uses once through carbon monoxide to reduce and sweep zinc from a reactor. Derham uses an electrothermal heating means to purify zinc metal distributed on a column of carbonaceous material. Lakernick et al. uses a stream of nitrogen gas to sweep zinc from a slag already treated with a carbonaceous reducing agent. Halley et al. reduces iron ore to iron using electric arc produced atomic hydrogen. Keith et al. describes the use of hydrogen to reduce metal oxides, but does not suggest using the method to separate one metal from another metal, does not mention metal distillation or volatilization and reoxidation, and does not provide for hydrogen regeneration and recovery. Finally, Hansgrig describes reducing magnesium oxide with carbon in a hydrogen atmosphere and distilling or volatilizing the magnesium in the same atmosphere to prevent the formulation of a magnesium oxide film on the purified metal. As with the other processes which use hydrogen, Hansgrig does not disclose regenerating and recycling the hydrogen.

In addition to the patent art, the technical literature of the basic metals industries is replete with articles on the uses and treatment of electric arc furnace (EAF) dust. The field was thoroughly reviewed in a Final Report entitled, "Electric Arc Furnace Dust—Disposal, Recycle and Recovery," which was prepared for the Center For Metal Production, Mellon Institute, Carnegie-Mellon University by the Research Department of Bethlehem Steel Corporation in 1985. The Report reviewed the then current and emerging EAF dust technology; especially technology which focused on removing zinc from the EAF dust. The technologies reviewed— plasma arc reactors, melt injection reactors, solid or liquid phase selective reduction, Waela Kiln, the HTR (Himezi Tekko Rifain) process, electrothermic smelting, and the SKF Plasmadust process—all use carbon compounds, i.e., coke, as the reductant. Technologies which did not use carbon compounds were hydrometallurgical, electrowinning and chlorination processes. These last technologies seriously suffered from cost or environmental problems, and in addition, did not recover zinc from zinc ferrite species present in the EAF dust.

A more recent review of the methods for recovering or disposing of EAF dust appears in the August, 1987 issue of *Iron and Steelmaking*, a publication of the Iron and Steel Society. The article, "So Little Time, So Many Choices" reviewed nine methods for treating EAF dust. With the exception of a fixation method that uses silicate and silica settling agents to stabilize the EAF dust in glass blocks, all the technologies used carbon compounds as the reductant.

It is an object of the present invention to provide a method for separating and recovering metals from a substance containing a mixture of metals or metal oxides. It is a further object of this invention to provide a method for such separation and recovery which regenerates and recycles the reducing gas which is used to reduce and separate the desired metals from said mixture of metals or metal oxides. It is a special object of this invention to provide a method for separating, volatilizing and recovering zinc (in the form of zinc oxide) from a mixture of metal or metal oxides, and especially from EAF dusts.

DETAILED DESCRIPTION OF THE INVENTION

This invention is directed to a method for the separation and recovery of metals as metal oxides from a raw material containing a mixture of metals and metal oxides. The raw material containing the mixture of metals and metal oxides is charged in a batch or continuous manner to a furnace or retort. The raw material is charged to the furnace in form of briquettes, pellets, granules or lumps of sufficient density so as not to be entrained in the hydrogen gas stream, but of sufficient porosity to permit permeation by the hydrogen gas. In some instances, the raw material may be used as obtained from the prior process, and in others the raw material is briquetted or agglomerated by methods known in the art. For example, an electric arc furnace dust may be mixed with water, and possibly a binder such as clay, and extruded. The extrudate would then be dried prior to passage into the furnace. The furnace into which the raw material is charged is preheated to a temperature at which the metal or metals to be recovered have a vapor pressure sufficient to permit their vaporization and removal and recovery from the raw material by means of a flowing gas stream.

An excess of hydrogen gas is introduced into the heated furnace or retort at a rate sufficient to reduce the metal oxide or oxides sought to be recovered to the metallic state and to sweep the vapor of the reduced metal from the furnace or retort into a metal or metal oxide recovery section or vessel. The hydrogen used in this invention should be of 95% or higher purity. Water vapor may constitute from about 0% to about 5% of the total gas introduced to the furnace, but the preferred range is 0% to about 1.0%. Inert gases such as nitrogen, argon, neon, and the like may be present, but the total of such gases and water vapor should be as low as possible. Oxygen should be eliminated from the incoming gas stream or should be below its explosion limit in hydrogen.

As one skilled in the art can readily see, the reactions occurring in the furnace are the reduction of the metal oxide to zero valent metal and the formation of water vapor by the reaction of hydrogen with the oxygen of the metal oxide. Because the subsequent processing involves the reversal of this reaction, it is desirable that the raw material consist essentially of metal oxides, though the the metallic form of the metal undergoing separation may also be present. Substances which do not undergo reduction by hydrogen under the conditions used in the process may be present, but substances which may contaminate the regenerated hydrogen or are difficult to remove from the regenerated hydrogen or could seriously corrode the equipment should be eliminated. For example, an EAF dust may contain silicates, but it should not contain sulfides, nitrates, halogenides and the like, or these should be minimized.

The hydrogen gas stream containing the metallic vapors recovered from the furnace is then humidified with water vapor or steam. The humidification is done in a humidifier/oxidizer section or vessel at a rate and in an amount sufficient to lower the temperature of the hydrogen/metal-vapor gas stream to a temperature at which the metallic vapor will substantially react with the water vapor to produce a metallic oxide or a mixture of metallic oxides and simultaneously regenerate hydrogen. It is preferred to oxidize zinc to zinc oxide at a temperature above the boiling point of zinc to avoid formation of liquid zinc droplets which may slow the rate of oxidation. For zinc, this temperature is in the range of about 700° C. to about 900° C. depending upon its vapor pressure in the product stream containing other gases such as hydrogen and steam. The resulting gas stream is then further humidified to lower the temperature of the mixed gas stream to a temperature in the range of about 150° C. to about 250° C. thereby essentially completing the conversion and causing condensation of the metallic vapor to a solid metal oxide form or to a solid metallic form.

The hydrogen/water-vapor gas stream containing the solidified metals or metal oxides is then treated to separate the solidified metal or metal oxides from gaseous hydrogen/water-vapor. This separation can be accomplished by any of the methods known in the art. For example, a cyclone separator may be used to afford a rough separation of the larger solid particles, and a bag filter or other filter device of sufficiently small porosity may be used to separate the smaller solid particles from the hydrogen/water-vapor stream. The separated metals or metal oxides are recovered and placed in the stream of commerce.

The hydrogen/water-vapor stream, free of metals or metal oxides, is passed through a water vapor or steam condenser or knock-out pot to condense the water vapor or steam and separate it from the hydrogen gas. The hydrogen gas stream may be further dried, if required, to a water vapor content in the range of about 0% to about 5% by means of a drying agent such as calcium chloride, molecular sieves, calcium sulfate and the like, and recycled to the furnace. The hydrogen may be preheated prior to introduction into the furnace and make-up hydrogen may be added to account for global losses.

In the process of this invention, the furnace or retort is preheated to a temperature in the range of about 900° C. to about 1200° C. either directly or indirectly. The preferred method is to indirectly heat the furnace and raw materials contained therein by means of a flowing gas stream. In the initial or start-up phase of this invention the heating gas is preferably an inert gas such as nitrogen or argon which purges the furnace of oxygen. Once the purging has been completed, the inert gas is replaced by hydrogen preheated to the desired temperature. The reduction, distillation, oxidation, separation and hydrogen regeneration steps then proceed as described above.

The following examples are illustrative of the process of this invention. They are not intended to be limiting. As in all processes in which hydrogen is used, safety measures for preventing explosions must be taken. The most important measure to be taken is to ensure that all parts of the equipment are leak proof.

EXAMPLES

The following experiments were conducted in a batch manner using a stainless steel laboratory scale reactor heated by a wrap-around electrical furnace. The reactor is vertically positioned, inlet side down (reactor bottom). The inlet port consists of concentric stainless steel tubes, the outer tube for the admission of hydrogen and the inner tube for the admission of nitrogen and/or water vapor ($N_2/H_2O$). The inner tube rises above the level of the reactor bed and the outer ($H_2$) tube terminates at the bottom of the bed to permit the hydrogen to flow upward through the reactor bed. The reactor bed itself, from bottom to top, consists of a wire mesh screen, a layer of pure sand, a layer of raw material and a second wire mesh retaining screen on top of the raw material layer. The distance from the top of the reactor bed to the outlet port is a void space whose length constitutes about 10% of the total length of the reactor. The $N_2/H_2O$ inlet tubes rises through the bed of the reactor to the top of the void space at the point where the outlet tube begins. The outlet tube passes through a heat exchanger, a particulate filter and is vented or recycled as desired. Thermocouples are placed throughout the apparatus to measure reactor bed, inlet, outlet and other temperatures as desired.

EXAMPLE 1

A reactor, as described above, with a 12 inch internal (bed) length and 1 inch internal diameter was charged with 2 inches of sand and 9 inches of pure zinc oxide (ZnO). A 1 inch void space was left at the top of the reactor bed. The reactor was purged with nitrogen and heated to 1060° C. Hydrogen was then admitted through the $H_2$ inlet port at a rate of 77 cc/min. and a mixture of nitrogen and water vapor admitted through the $N_2/H_2O$ inlet port at a rate of 700 cc/min. Theoretical calculations based on the hydrogen used indicate 12.1g ZnO should be converted and recovered. Actual conversion based on ZnO weight difference before and after hydrogen treatment, was 8.5g (70%).

EXAMPLE 2

Pure ZnO was hydrogen treated as in Example 1 at 1100° C. using four times the $H_2$ flow rate of Example 1. Theoretical conversion and recovery of ZnO was 12.4g. Actual conversion based on weight differences was 13.8g (112%).

The closeness of the theoretical and actual conversion values in Examples 1 and 2 suggests that the kinetics of the reactions are rapid and that the conversion of ZnO to Zn, and its subsequent reconversion, will follow thermodynamics. Commercially, this means that design of a zinc conversion/recovery system can be based on thermodynamic data without taking kinetics into account.

EXAMPLE 3

A 50/50 mixture of ZnO and $Fe_2O_3$ was charged to the reactor and treated according to Examples 1 and 2. A total of four tests were conducted. Zinc conversion, based on weight differences, ranged from 70-110%.

EXAMPLE 4

A sample of EAF dust containing 18% magnesium, 2% aluminum, 9.9% silicon, 5.4% calcium, 1.7% chromium, 8.8% manganese, 43.8% iron, 5.7% zinc, and minor amounts of sulfur, chlorine, potassium and nickel were charged to the reactor, heated to 1000° C. and treated as in Example 1. Analysis of the reactor bed after hydrogen treatment showed that the top 40% of the bed was non-magnetic and zinc enriched. The bottom 60% of the bed was a magnetic iron sponge and was zinc depleted. Magnetic separation was necessary to separate the iron sponge from the zinc-rich non-magnetic materials. The zinc content of the magnetic iron sponge was 2.4%, which is low enough to allow the sponge to be recycled to an electric arc furnace. The zinc-rich (14.6% Zn) material can be used in a secondary zinc recovery reactor. Analytical data for Examples 4 and 5 are based on the contents of the reactor. The small total amount of zinc present in the EAF dust, about 1g, and losses of zinc oxide to the walls of the outlet tube precluded recovery of zinc oxide.

EXAMPLE 5

A sample of the EAF dust was hydrogen treated at 1100° C. according to Example 4. All the material remaining in the reactor was sponge iron containing 0.65% Zn. This material may be recycled to the electric arc furnace. Zinc conversion and removal from the EAF dust was 88%.

EXAMPLE 6

Additional samples of EAF dust from two industrial sources were evaluated by the method of this invention. Table 1, below, lists the condition under which the dusts were evaluated. Tables 2 and 3 give the results of such tests, including the percentage removal of lead and cadmium from the dust sample.

TABLE 1

| DETAILS OF EXPERIMENTS | | |
|---|---|---|
| | Expt. No. 1 | Expt. No. 2 |
| Source of dust | Source 1 | Source 2 |
| Weight of dust, g | 30.0 | 51.0 |
| Hydrogen flow rate, cc/min | 100 | 100 |
| Temperature, °C. | 1100 | 1100 |
| Time of reaction, min | 50 | 70 |
| Weight of magnetic residue, g | 16.0 | 21.7 |
| Weight of non-magnetic residue, g | 5.5 | 19.8 |
| *Estimated hydrogen requirement, g-moles | 0.32 | 0.55 |
| Amount of hydrogen used, g-moles | 0.223 | 0.313 |
| Estimated reduction, % | 69.7 | 56.9 |
| **Actual reduction, % | 74.4 | 52.3 |

*Assuming that iron is present as ferric oxide, and neglecting hydrogen requirement for other metal oxides.
**Based on weight fraction of magnetic material in the residue.

TABLE 2
EXPERIMENT WITH SOURCE 1 DUST

| | Original Dust | Residue Magnetic | Residue Non-magnetic |
|---|---|---|---|
| Iron, % | 39.5 | 56.8 | 50.2 |
| Zinc, % | 6.6 | 1.6 | 3.1 |
| Lead, % | 1.5 | 0.18 | 0.14 |
| Chromium, % | — | 1.02 | 0.29 |
| Cadmium, ppm | 200 | 120 | 110 |
| % Lead removed | — | 88 | 91 |
| % Cadmium removed | — | 40 | 45 |

TABLE 3
EXPERIMENT WITH SOURCE 2 DUST

| | Original Dust | Residue Magnetic | Residue Non-magnetic |
|---|---|---|---|
| Iron, % | 40.0 | 56.0 | 50.0 |
| Zinc, % | 7.7 | 1.1 | 5.2 |
| Lead, % | 0.9 | 0.15 | 0.15 |
| Chromium, % | — | 0.39 | 0.22 |
| Cadmium, ppm | 300 | 110 | 110 |
| % Lead removed | — | 83 | 83 |
| % Cadmium removed | — | 63 | 63 |

What is claimed is:

1. A method for the separation and recovery of metals as metal oxides from raw material containing a mixture of metals and metal oxides comprising:
   (a) heating a raw material containing a mixture of metals and metal oxides in briquette, pellet, granular or lump form in a furnace to a temperature above that at which the desired metals are vaporized, said temperature being in the range of from about 900° C. to about 1200° C.;
   (b) contracting the heated raw materials with a stream of hydrogen gas to reduce and vaporize the desired metal oxide or oxides;
   (c) humidifying the stream of hydrogen gas and metallic vapors recovered from the furnace with water in the form of water vapor or steam to lower the temperature of the gas stream to that at which the metallic vapors react with the water to produce a solid metallic oxide or mixture of metallic oxides, said humidification taking place in a first humidification step wherein the temperature is reduced to within the range of from about 700° C. to about 900° C. and is followed by a second humidification step to a temperature in the range of from about 150° C. to about 250° C.;
   (d) separating the solidified metal oxide from the hydrogen gas stream;
   (e) condensing excess water from the hydrogen gas stream; and
   (f) recycling the hydrogen gas stream.

2. A method for the separation and recovery of zinc, cadmium, antimony or led as their oxides from raw material containing zinc, cadmium, antimony and lead, or their oxides, or a mixture thereof comprising:
   (a) heating a raw material containing zinc, cadmium, antimony or lead, or their oxides, or a mixture thereof, in briquette, pellet, granular or lump in a furnace to a temperature above that at which zinc, cadmium, antimony or lead are volatilized;
   (b) contacting the heated raw materials with a stream of hydrogen to reduce the oxide of zinc, cadmium, antimony or lead to the metallic state and vaporize the metallic zinc, cadmium, antimony or lead;
   (c) humidifying the stream of hydrogen gas and metallic vapors recovered from the furnace with water in the form of water vapor or steam to lower temperature of the gas stream to that at which the metallic vapors react with the water to produce a solid metallic oxide or mixture of metallic oxides, said humidification taking place in a first humidification step wherein the temperature is reduced to within the range of from about 700° C. to about 900° C and is followed by a second humidification step to a temperature in the range of from about 150° C. to about 250° C.;
   (d) separating the solidified metallic oxide or oxides from the hydrogen gas stream;
   (e) condensing excess water from the hydrogen gas stream; and
   (f) recycling the hydrogen gas stream.

3. A method in accordance with claims 1 or 2 wherein the raw material is selected from the group consisting of metal ore, electric arc furnace dust, foundry dust, blast furnace dust and recovered metallic powders.

4. A method in accordance with claims 1 or 2 wherein the hydrogen gas stream applied to the raw material has a water vapor content in the range of about 0% to about 5%.

5. A method for the separation of zinc as zinc oxide from a raw material containing a mixture of zinc or zinc oxide and other metals or metal oxides which melt at a temperature above about 1200° C. in the reduced state comprising:
   (a) heating a zinc or zinc oxide containing raw material in a furnace to a temperature in the range of about 900° C. to about 1200° C.;
   (b) contacting the heated raw material with a stream of hydrogen gas to reduce zinc oxide to metallic zinc and vaporize the zinc;
   (c) humidifying the stream of hydrogen gas and metallic zinc vapor recovered from the furnace with water in the form of water vapor or steam to lower the temperature of the gas stream to a temperature in the range of about 750° C. to about 900° C., thereby reacting the metallic zinc vapor with water to produce solid zinc oxide, said humidification taking place in a first humidification step wherein the temperature is reduced to within the range of from about 700° C. to about 900° C. and is followed by a second humidification step to a temperature in the range of about 150° C. to about 250° C.;
   separating the solidified zinc oxide from the hydrogen gas stream;
   (e) condensing excess water from the stream; and
   (f) recycling the hydrogen gas stream.

6. A method in accordance with claim 5 wherein the raw material is selected from the group consisting of zinc ore, electric arc furnace dust, foundry dust, blast furnace dust and recovered metallic powders.

7. A method in accordance with claim 5 wherein the raw material is electric arc furnace dust.

8. A method in accordance with claim 5 wherein the raw material is preferrably heated to a temperature in the range of about 1050° C. to about 1150° C.

9. A method in accordance with claim 5 wherein the hydrogen gas stream supplied to the raw material has a water vapor content in the range of about 0% to about 5%.

* * * * *